UNITED STATES PATENT OFFICE.

JOSEPH RAMSEY BLACK, OF NINETY-SIX, SOUTH CAROLINA.

IMPROVEMENT IN FERTILIZERS.

Specification forming part of Letters Patent No. 125,927, dated April 23, 1872.

Specification describing certain improved Composition for Chemical Fertilizer, invented by JOSEPH RAMSEY BLACK, of Ninety-Six, in the county of Abbeville and State of South Carolina.

This invention relates to a new fertilizer compound, of such nature that by its use the most beneficent results on growing crops are obtained without impoverishing the soil or the owners thereof. The invention consists in such a rational combination of stable manure with cheap chemicals, that thereby the elements of an excellent fertilizer are produced at comparatively little expense, and at a small outlay of labor.

I compound the fertilizer, first, of stable manure, cow-pen manure, and virgin soil or muck, in equal quantities, free from sand, or water, and all well mixed together. Second, of saltpeter, fifty pounds; common salt, three barrels; lime, three barrels; ashes, five barrels, well mixed together.

The pen in which the fertilizer is prepared should be well lined with boards, and sheltered from rain. I first put into the pen so much of the first compound as to fill it to the height of about twelve inches, leveling and moderately packing the same. The quantity thus put in is preferably weighed, so that the necessary proportion of the matter to be added can be properly ascertained. Of the second compound there is then so much added as will be equal to about one-fourth the weight of the first layer. Then another layer of No. 1, equal to the first, is put on; then another of No. 2, equal to the second; and so forth, alternately, till completed, finishing with No. 2, five inches thick.

The compost thus put up will be ready for use in four weeks. But if straw, leaves or other articles are put in the heap, partly or not at all decomposed, more time will be required.

When the compost is to be used, one side of the pen is removed, and the heap cut down perpendicularly, taken to the field and covered without delay, to be bedded on at leisure. It should be put in the ground to such a depth as not to be disturbed when the bed is re-opened for planting.

It is evident that the proportions herein stated, the thickness of layers, &c., may be varied more or less in accordance with the nature of soil to be treated, crop to be grown, &c.

Having thus described my invention, I claim as new and desire to secure by Letters Patent—

The composition for a fertilizer, as set forth.

JOSEPH RAMSEY BLACK.

Witnesses:
 EDWARD NOBLE,
 W. A. LEO.